(12) United States Patent
Pan et al.

(10) Patent No.: US 8,693,727 B2
(45) Date of Patent: Apr. 8, 2014

(54) IMAGE PROCESSING DEVICE AND IMAGE PROCESSING METHOD THEREOF

(75) Inventors: Chia-Ho Pan, Tainan (TW); Shuei-Lin Chen, Kaohsiung (TW); I-Hsien Lee, Hsinchu (TW)

(73) Assignee: Altek Corporation, Hsinchu (TW)

( * ) Notice: Subject to any disclaimer, the term of this patent is extended or adjusted under 35 U.S.C. 154(b) by 312 days.

(21) Appl. No.: 13/240,647

(22) Filed: Sep. 22, 2011

(65) Prior Publication Data

US 2013/0016878 A1  Jan. 17, 2013

(30) Foreign Application Priority Data

Jul. 15, 2011 (TW) .............................. 100125236 A

(51) Int. Cl.
*G06K 9/00* (2006.01)
(52) U.S. Cl.
USPC ......................................................... 382/103
(58) Field of Classification Search
None
See application file for complete search history.

(56) References Cited

U.S. PATENT DOCUMENTS

| | | | |
|---|---|---|---|
| 6,542,626 B1* | 4/2003 | Brouwer et al. | 382/128 |
| 7,453,456 B2* | 11/2008 | Petrov et al. | 345/419 |
| 7,956,929 B2* | 6/2011 | Relan et al. | 348/576 |
| 8,311,282 B2* | 11/2012 | Luo et al. | 382/103 |
| 2006/0232583 A1* | 10/2006 | Petrov et al. | 345/419 |
| 2011/0255775 A1* | 10/2011 | McNamer et al. | 382/154 |

* cited by examiner

*Primary Examiner* — Nancy Bitar
(74) *Attorney, Agent, or Firm* — Wang Law Firm, Inc.; Li K. Wang; Stephen Hsu

(57) ABSTRACT

An image processing device and an image processing method thereof. The image processing device comprises a memory module, an object detection module and a processing module. The memory module is provided for storing a plurality of images captured by a camera module, and the image comprises at least one object. The object detection module retrieves one of the images as a reference image and compares the remaining images with the reference image to locate a region where the object with corresponding contour and color is situated. If the object detection module compares and determines that the object with the corresponding contour and color is situated in different regions of the reference image and the remaining images, the processing module will remove the corresponding object in the reference image or superimpose each corresponding object in the reference image simultaneously.

13 Claims, 11 Drawing Sheets

IMAGE PROCESSING DEVICE AND IMAGE PROCESSING METHOD THEREOF

FIELD OF THE INVENTION

This application claims priority from Taiwan Patent Application No. 100125236, filed on Jul. 15, 2011, the contents of which are hereby incorporated by reference in their entirety for all purposes.

The present invention relates to an image processing device and a method thereof, in particular to the image processing device and the method thereof capable of removing or superimposing a moving object by means of an object and color oriented concept.

BACKGROUND OF THE INVENTION

At present, most people will use cameras to take their favorite photos, regardless of landscapes or portraits, but sometimes the photos taken are not as good as expected, and some photos may even have flaws. Therefore, various different image processing software are available in the market and provided for users to modify an unsatisfactory portion of a photo. For example, the image processing software can be used for removing a red eye, brightening up a portion of a photo, or synthesizing a photo with enriched contents.

As the science and technology advance, the image processing not only be used for processing a photo shot by a camera but also be built in an image processing device directly to carry out an image processing while the camera is taking a photo. The camera with the aforementioned image processing function further provides different image processing modes of several cameras such as a motion removal mode and a multi-motion capture mode for users to process the photos.

In the motion removal mode, five photos of a scene are shot and analyzed to detect which object (such as a pedestrian, a car, or a flying bird) is moving continuously in the scene, and then the five photos are computed to form an image with the moving object removed completely. This mode is used to remove unwanted objects. In the multi-motion capture mode, the five successively shot photos are used to integrate all moving objects of the scene into a photo, so that the photo has a continuously moving object.

Since these cameras having both motion removal mode and multi-motion capture mode performs recognitions primarily by detecting the motion of an object, the moving object may be removed or superimposed improperly or incompletely when the moving object is removed or superimposed.

SUMMARY OF THE INVENTION

In view of the drawbacks of the prior art, it is a primary objective of the present invention to provide an image processing device and a method thereof, and both device and method use a recognition technology of the contour and color of an object to overcome the problems of incomplete removal or superimposition of the object caused by the conventional image processing technology.

To achieve the aforementioned objective, the present invention provides an image processing device, comprising a memory module, an object detection module and a processing module, wherein the object detection module is electrically coupled to the memory module and the processing module. The memory module is provided for storing a plurality of images captured by a camera module. The object detection module is provided for obtaining one of the images as a reference image and the other images as remaining images, and performing a contour comparison and a color comparison to compare the remaining images with the reference image to search an object which exists in both the reference image and at least one of the remaining image according to a corresponding contour and a corresponding color, and compare locations of the object in the images. If the object detection module determines that the locations of the object in the reference image and at least one of the remaining images are different, the processing module will remove the object in the reference image or superimpose the object of at least one of the remaining images to the reference image.

To achieve the aforementioned objective, the present invention provides an image processing method, comprising the steps of: using a memory module to store a plurality of images captured by a camera module; using an object detection module to retrieve one of the images as a reference image and the other images as remaining images, and performing a contour comparison and a color comparison to compare the remaining images with the reference image, so as to search an object which exists in both the reference image and at least one of the remaining images according to a corresponding contour and a corresponding color, and compare locations of the object in the images; and using the processing module to remove the objects in the reference image or superimposing the object of at least one of the remaining images to the reference image if the object detection module determines that the locations of the object in the reference image and at least one of the remaining images are different.

Wherein, the object detection module further comprises an image stabilizing unit for performing a global motion comparison between the remaining images and the reference image, so that frames of the remaining images and the reference image are evenly aligned with each other.

Wherein, the object detection module further comprises a basic image comparing unit for comparing the reference image with a basic background image in the remaining images.

Wherein, the object detection module further comprises a contour comparing unit for determining whether or not the remaining images have an object with a contour corresponding to the object in the reference image; if yes, then locate a region between the reference image and the remaining images where the corresponding object is situated.

Wherein, the object detection module further comprises a color capture unit for retrieving a color of the object with the contour corresponding to the object in the reference image and the remaining images and performing a comparison.

Wherein, the object detection module further comprises a superimposition detection unit for detecting whether or not the corresponding objects situated in the region of the reference image and the remaining images have an overlapped portion.

Wherein, the processing module comprises an image superimposition unit for performing a boundary detection of each corresponding object when the corresponding objects have an overlapped portion, and superimposing each corresponding object in the reference image simultaneously according to a time sequence of capturing each image by the camera module.

Wherein, a later superimposed object is bound to the boundary of a previous superimposed object and an overlapped portion of the later superimposed object and the previous superimposed object is removed.

Wherein, the processing module further comprises an image removal unit for removing the corresponding object in the reference image and duplicating the removed region of the corresponding object from the same region of the image in the remaining images to compensate a junction.

In summation, the image processing device and method thereof of the present invention have one or more of the following advantages:

(1) The image processing device and method thereof primarily use the contour and color of an object for identifying the object to determine whether or not the object is moving in order to achieve the function of removing or superimposing the object more accurately and avoid an incomplete removal or superimposition.

(2) The image processing device and method thereof further use a frame-based voting to find the position and the size of a moving object effectively, so as to facilitate completing the removal or superimposition of the objects.

DESCRIPTION OF THE PREFERRED EMBODIMENTS

The technical characteristics and effect of the image processing device and the method thereof in accordance with the present invention will become apparent by the detailed description of preferred embodiments and related drawings as follows. For simplicity, same numerals are used to represent respective elements in the preferred embodiment and drawings.

The image processing device of the present invention is applicable for various portable electronic devices including a digital camera, a camera phone, a Smartphone or a digital video camera, so that a user can take pictures while processing images, or can install the image processing device into a personal computer, a notebook computer or a tablet PC to process images at a later stage. It is noteworthy to point out that the preferred embodiments focusing on the synchronous processing of captured images are provided for the purpose of illustrating the invention only, but not intended for limiting the scope of the invention.

Figure 1:
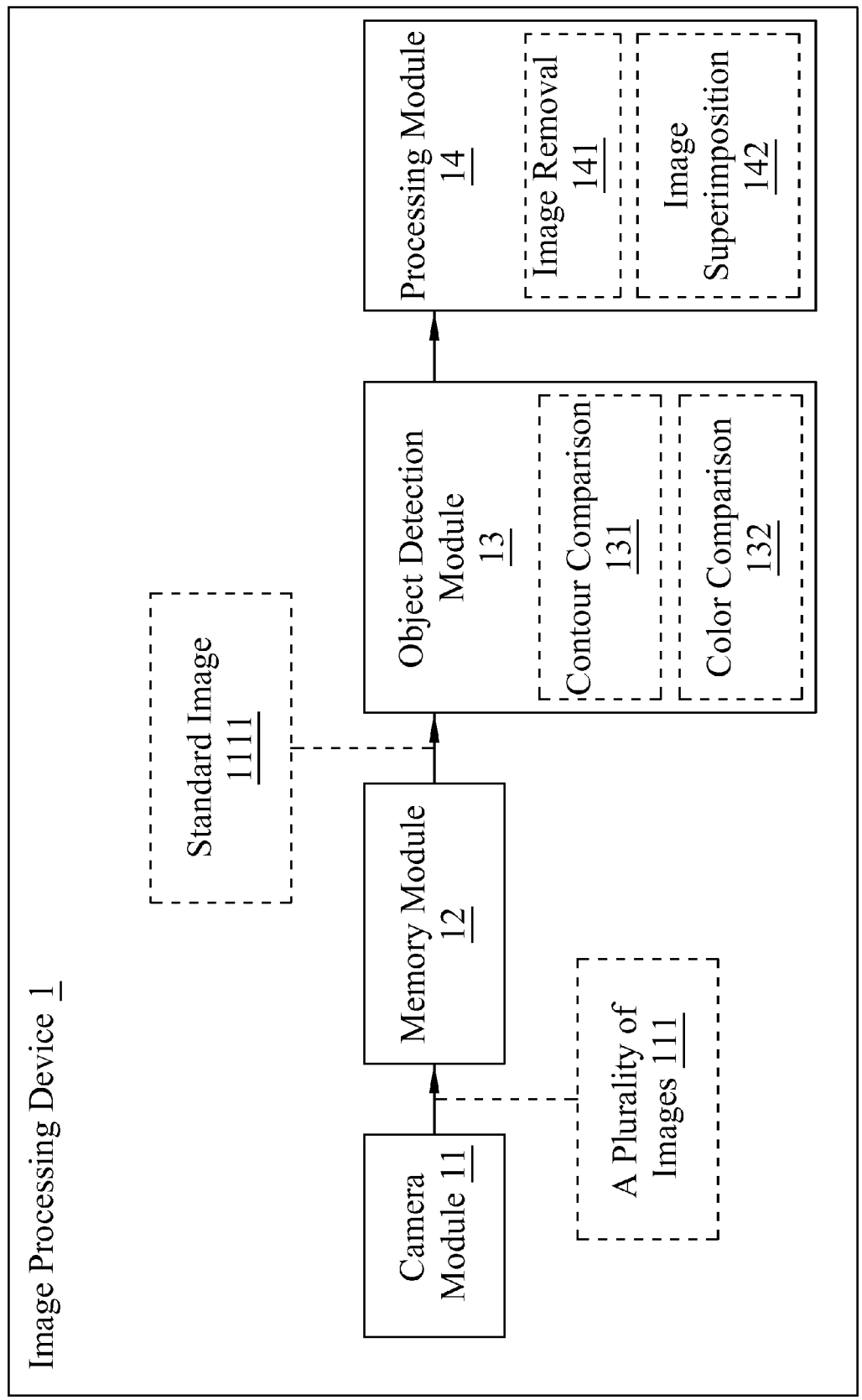
FIG. 1 is a block diagram of an image processing device in accordance with a first preferred embodiment of the present invention.

With reference to FIG. 1 for a block diagram of an image processing device in accordance with the first preferred embodiment of the present invention, the image processing device 1 comprises a camera module 11, a memory module 12, an object detection module 13 and a processing module 14. Wherein, the memory module 12 is coupled to the camera module 11 and the object detection module 13, and the object detection module 13 is coupled to the processing module 14. The camera module 11 is provided for capturing an image and includes a camera lens, a light sensor such as a complementary metal-oxide-semiconductor (CMOS), a charge-coupled-device (CCD), and an analog/digital circuit. The memory module 12 can be an embedded buffer memory, a physical memory, an external memory card or a combination of the above, and the memory module 12 is provided for storing the image captured by the camera module 11.

In the first preferred embodiment, the camera module 11 captures a plurality of images 111 successively from a scene and stores the images 111 into the memory module 12, and the object detection module 13 retrieves one of the images 111 as a reference image 1111 and the other images as remaining images, and performs a contour comparison 131 and a color comparison 132 to compare the remaining images with the reference image 1111, so as to search an object which exists in both the reference image 1111 and at least one of the remaining images according to a corresponding contour and a corresponding color, and compare locations of the object in the images 111, so as to determine whether or not there is a moving object in the plurality of images 111 successively captured from the scene. If the object detection module 13 determines the locations of the object in the reference image 1111 and at least one of the remaining images are different (in other words, there is a moving object in the plurality of images 111), then the processing module 14 will perform an image removal 141 or an image superimposition 142 to remove the objects in the reference image 1111, or remove the moving object, or the processing module 14 superimposes the object of at least one of the remaining images to the reference image 1111, so that a motion track of the moving object can be shown in the same image. It is noteworthy to point out that removing the moving object or superimposing the object is not simply a single mode, so that the object can be produced in an image simultaneously. For example, one of the moving objects in the image is removed, and the other moving objects are introduced from the remaining image superimpositions.

Figure 2:
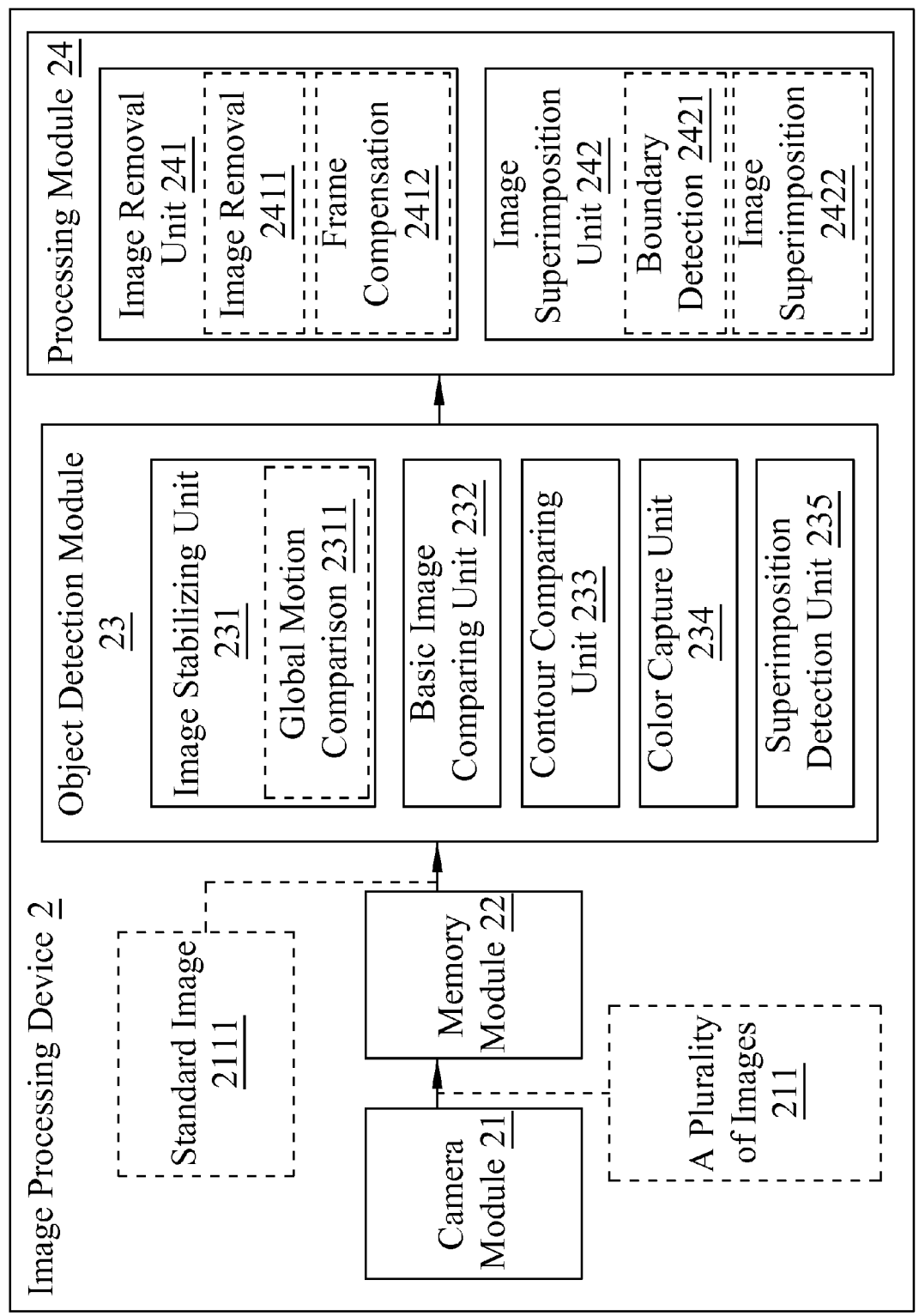
FIG. 2 is a block diagram of an image processing device in accordance with a second preferred embodiment of the present invention.

With reference to FIG. 2 for a block diagram of an image processing device in accordance with the second preferred embodiment of the present invention, the image processing device 2 comprises a camera module 21, a memory module 22, an object detection module 23 and a processing module 24. Wherein, the object detection module 23 includes an image stabilizing unit 231, a basic image comparing unit 232, a contour comparing unit 233, a color capture unit 234 and a superimposition detection unit 235. The processing module 24 includes an image removal unit 241 and an image superimposition unit 242, and the memory module 22 is electrically coupled to the camera module 21 and the object detection module 23, and the object detection module 23 is electrically coupled to processing module 24.

In the second preferred embodiment, if the camera module 21 captures a plurality of images 211 successively from a scene and stores the plurality of images 211 into the memory module 22, the object detection module 23 can select one of the plurality of images 211 as a reference image 2111 and the other images 211 as remaining images 211, and then the image stabilizing unit 231 performs a global motion comparison 2311 between the remaining images 211 and the reference image 2111, such that frames of the remaining images 211 and the reference image 2111 can be evenly aligned with one another. The image stabilizing unit 231 can be an optical image stabilizer (OIS) or a digital image stabilizer (DIS) for detecting a motion vector of a user's handshaking to rapidly move the lens in order to correct the frame of the captured image. Therefore, even if a handshaking occurs during the process of capturing the images, the image stabilizing unit 231 can make a correction so that the frames of the remaining images 211 and the reference image 2111 can be evenly aligned with one another.

After the frames of the images are evenly aligned, the contour comparing unit 233 is used to determine whether or not there is an object with a contour corresponding to the reference image 2111 among the remaining images 211; if yes, then locates a region where the corresponding objects are situated in the images to determine whether or not there is a moving object in the successively taken images 211. When performing the object contour comparison, the object detection module 23 also uses the basic image comparing unit 232 to compare the reference image 2111 with a basic background image in the remaining images 211 to confirm that the basic background images of all images are the same, and uses the object with the corresponding contour and the basic background image as references to determine whether or not there is a corresponding object moving in the basic background image more accurately to find the position and the size of the moving object effectively.

After the position of the object with the corresponding contour is found, the color capture unit 234 captures the color of the corresponding objects in the remaining images 211 and the reference image 2111 and performs a comparison to confirm that they are the same object. The superimposition detection unit 235 of the object detection module 23 is provided for detecting and determining whether or not the objects with the corresponding contour and color have an overlapped portion situated at the position of the reference image 2111 and the positions of the remaining images 211. In this preferred embodiment, the sequence of the image stabilizing unit 231, the basic image comparing unit 232, the contour comparing unit 233, the color capture unit 234 and the superimposition detection unit 235 of the object detection module 23 for detecting and identifying the object and the background image is used in this preferred embodiment for illustrating the present invention, but not intended for limiting the scope of the invention. It is noteworthy to point out that the detection process can be changed freely or occurred at the same time, and the process is not limited to the aforementioned detection method only.

After the comparison and identification of each unit by the object detection module 23 are completed and if the object detection module 23 determines that the objects with the corresponding contour and color existing in the reference image 2111 and the remaining image 211 and situated at different positions, it shows that there are moving objects in the successive taken images 211, so that the image removal unit 241 of the processing module 24 will perform an image removal 2411 to remove the moving object from the reference image 2111. After the object is removed, the image removal unit 241 will select an image having the highest bounding level with the reference image 2111 from the remaining images 211 at the position of the removed object in the reference image 2111, and then the frame at the same position in the remaining images 211 is duplicated into the reference image 2111 to complete a frame compensation 2412. By the image removal, the moving object in the image can be removed to provide a more beautiful image.

If it is necessary to superimpose the moving object onto the reference image 2111, the image superimposition unit 242 can be used. If the detection process carried out by the superimposition detection unit 235 determines that each corresponding object is situated at different positions without any overlapped portions, the image superimposition unit 242 will perform an image superimposition 2422 directly to superimpose the corresponding object onto the reference image 2111. If the detection determines that the corresponding object has an overlapped portion, the image superimposition unit 242 will perform a boundary detection 2421 of the moving object and an image superimposition 2422. The superimposition method primarily adopts the time sequence of capturing the images, wherein the corresponding object of the first or last captured image is superimposed first, and then an object of a later or an earlier captured image is bound to the boundary of the previous superimposed object, and the overlapped portions of the later superimposed object and the previous superimposed object are removed, so that the moving object in a series of motion can be shown in a same image.

Figure 3:
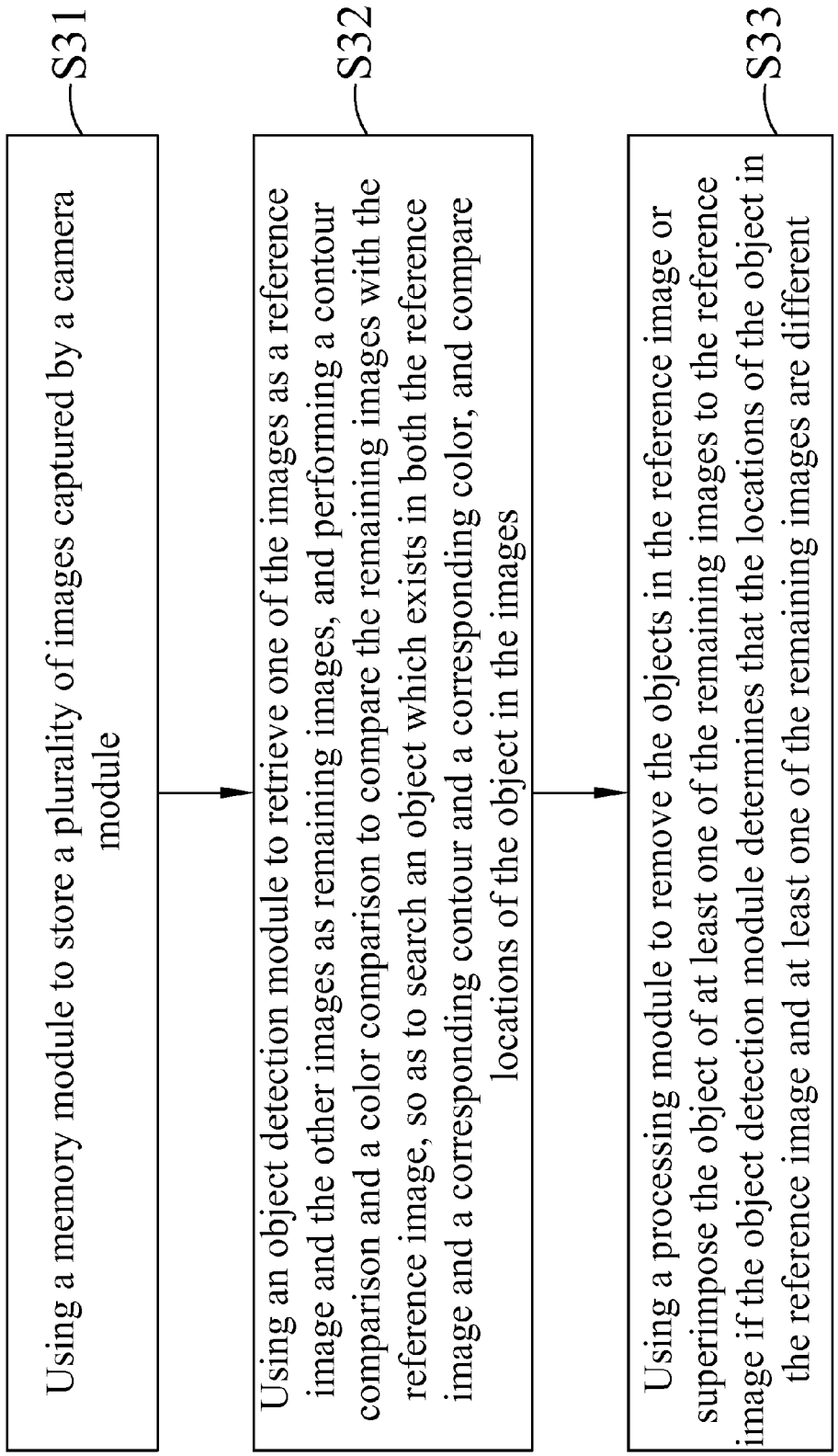
FIG. 3 is a flow chart of an image processing method of the present invention.

With reference to FIG. 3 for a flow chart of an image processing method of the present invention, the method comprises the steps of: (S31) using a memory module to store a plurality of images captured by a camera module; (S32) using an object detection module to retrieve one of the images as a reference image and the other images as remaining images, and performing a contour comparison and a color comparison to compare the remaining images with the reference image, so as to search an object which exists in both the reference image and a corresponding contour and a corresponding color, and compare locations of the object in the images; (S33) using a processing module to remove the objects in the reference image or superimpose the object of at least one of the remaining images to the reference image if the object detection module determines that the locations of the object in the reference image and at least one of the remaining images are different.

As described above, the camera module captures a plurality of images of a scene, and the object detection module and the processing module can remove a moving object in the scene or superimpose the moving object to the same image. In the processes of detecting and identifying the moving object by the object detection module, frames of the remaining images and the reference image are evenly aligned with each other, so that the regions of the images are aligned. Further, basic background images in the remaining images and the reference image are compared to confirm that the background images of each image is the same in order to find the position and the size of the moving object more effectively. Further, the object detection module will determine whether or not the moving object situated in the region of each image has an overlapped portion. After removing the moving object, the processing module will select an image from the remaining images at the position of removing the moving object in the reference image to perform a frame compensation. If the processing module performs a superimposition of the moving object, a different superimposition method will be adopted according to the situation whether or not the moving object has an overlap. If there is no overlap, the moving object is duplicated directly from each of the remaining images to the reference image; and if there is an overlap, then a boundary detection of the moving object of each image will be performed, and then the moving objects are superimposed according to the time of capturing the image. Wherein, a later superimposed object is connected to the boundary of a previous superimposed object, and the overlapped portion of the later superimposed object is removed to complete the superimposition of the moving object. However, the superimposition of the object in accordance with this preferred embodiment is provided for illustrating the present invention only, but not intended for limiting the scope of the invention.

Figure 4:
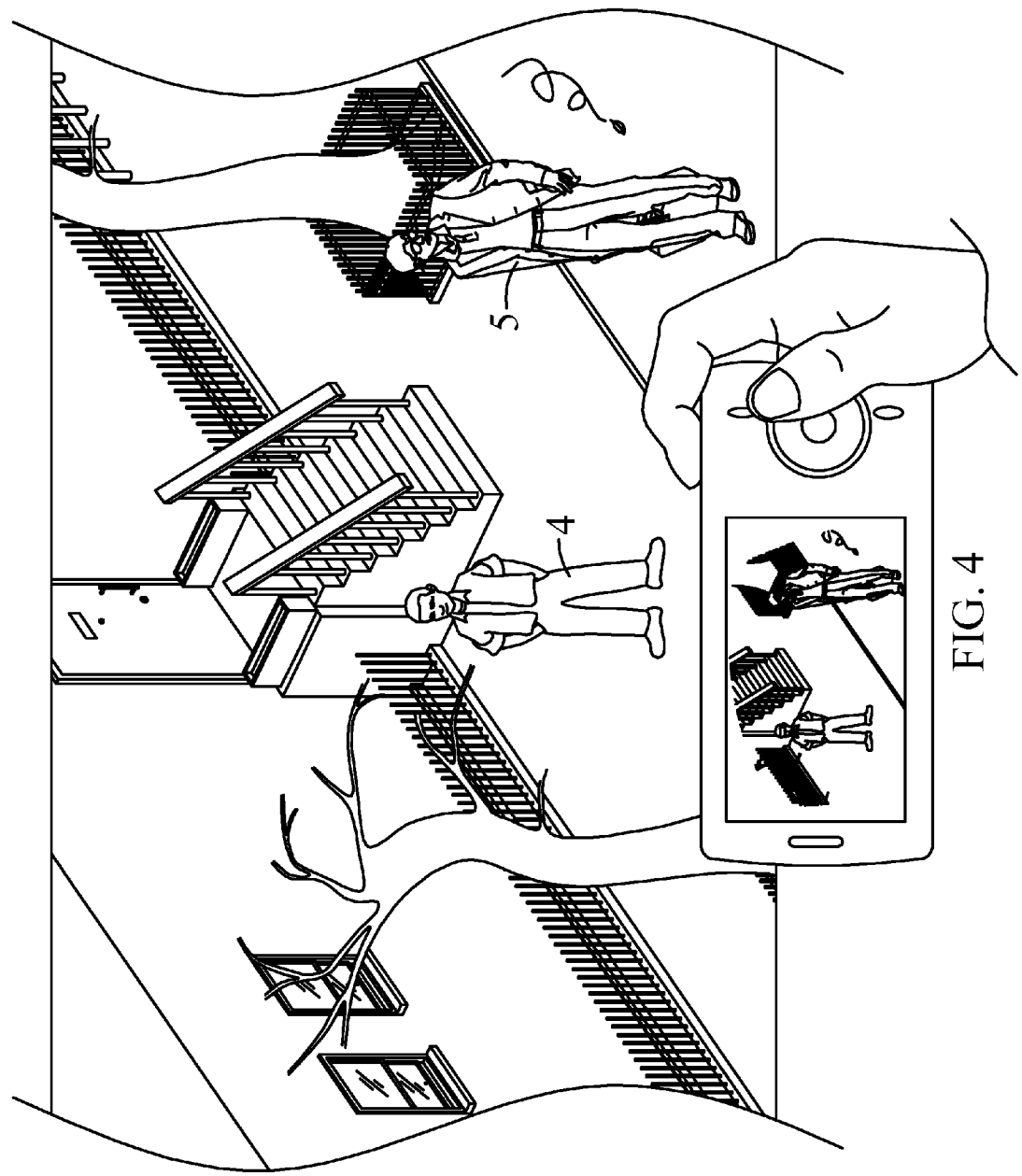
FIG. 4 is a first schematic view of an image processing device and method thereof in accordance with a third preferred embodiment of the present invention.

With reference to FIG. 4 for a first schematic view of an image processing device and method thereof in accordance with the third preferred embodiment of the present invention, a user carries a camera with the image processing device of the present invention of a scene and captures an image of the scene, and a basic background image including a house and trees, and a character object 4 and a character object 5 in the captured image.

Figure 5:
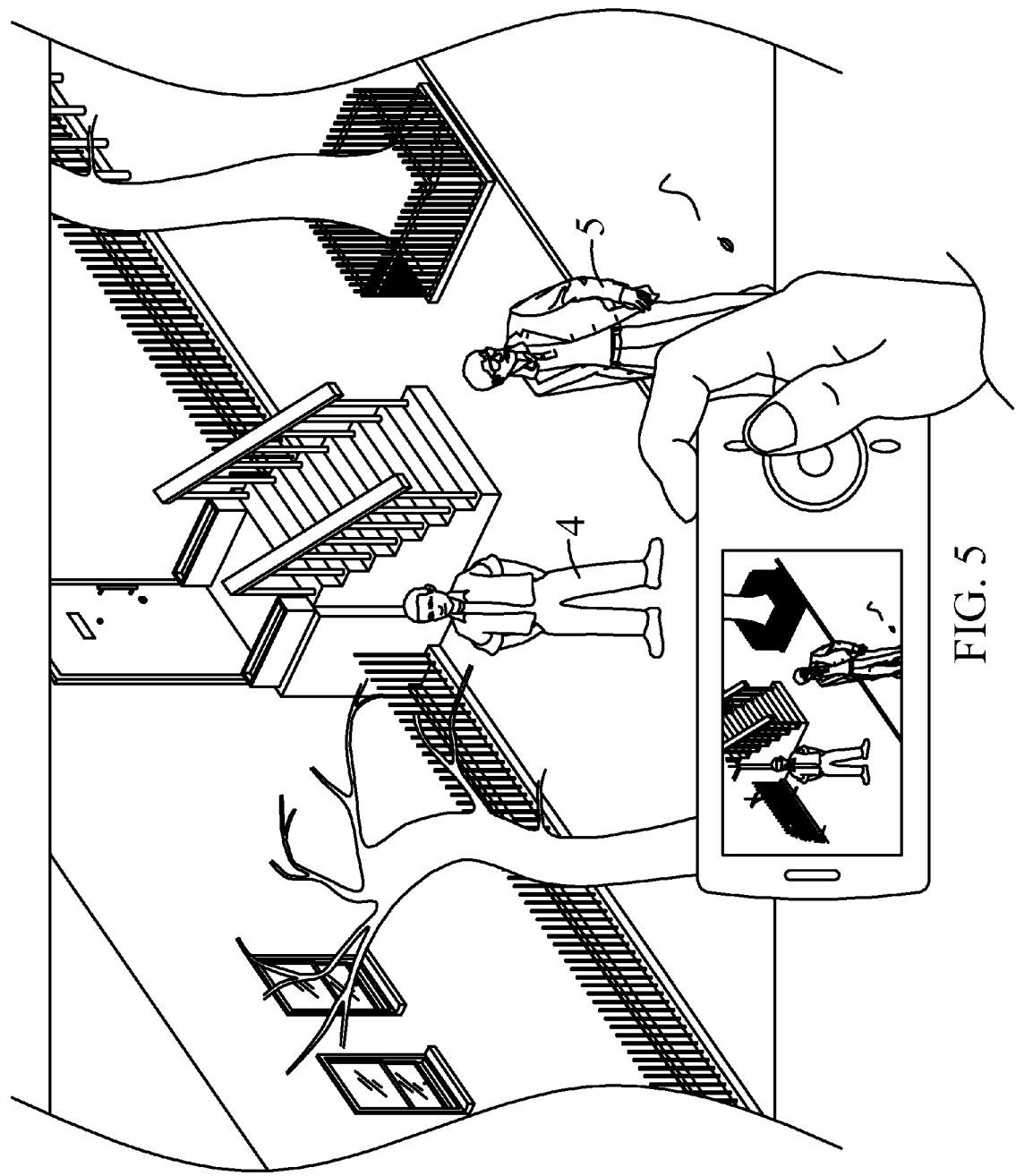
FIG. 5 is a second schematic view of an image processing device and method thereof in accordance with the third preferred embodiment of the present invention.

With reference to FIG. 5 for a second schematic view of an image processing device and method thereof in accordance with the third preferred embodiment of the present invention, the user captures a second image of the same scene. Similarly, the image also has a basic background image including a house and trees, and character objects 4, 5. The difference between FIGS. 5 and 4 is that the character object 5 is situated at different positions of the two image frames.

Figure 6:
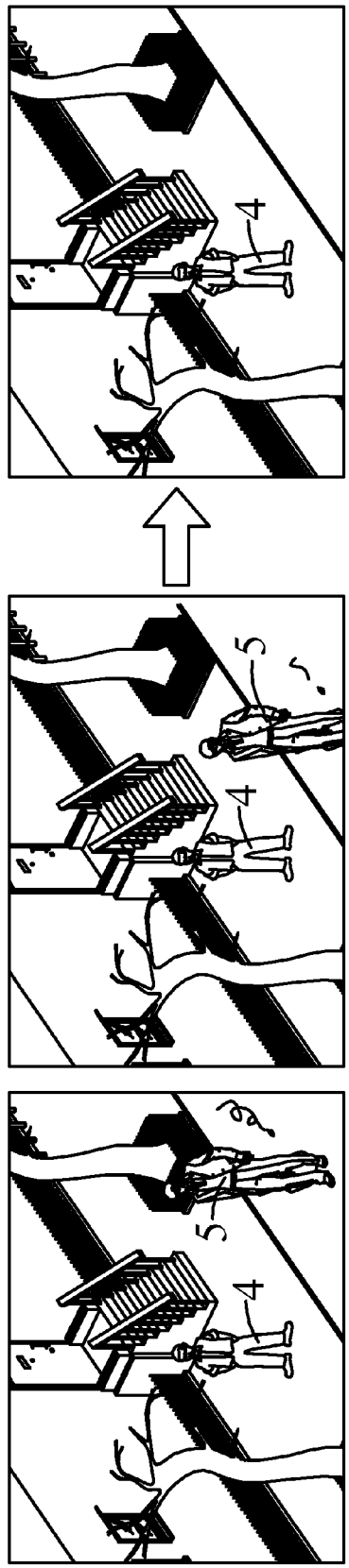
FIG. 6 is a third schematic view of an image processing device and method thereof in accordance with the third preferred embodiment of the present invention.

With reference to FIG. 6 for a third schematic view of an image processing device and method thereof in accordance with the third preferred embodiment of the present invention, the two images in FIGS. 4 and 5 show that the character object 5 is a moving object, and the image processing device of the present invention can remove the moving objects. In the removal method, the object detection module of the image processing device is provided for selecting one of the captured images as a reference image, which is the captured image as shown in FIG. 4. An image stabilizing unit of the object detection module is provided for performing a global motion comparison of the image as shown in FIG. 5 with the reference image, such that frames of the two images are evenly aligned with each other. A contour comparing unit of the object detection module is provided for comparing the image as shown in FIG. 5 with the reference image to determine whether or not there is a corresponding object and find the position of the corresponding object. A basic image comparing unit of the object detection module is provided for comparing and determining whether or not basic background images of the two images are the same, and the contour comparing unit compares the located character objects 4 and 5 which are found by the contour comparing unit with the background images to determine the position and the size of the character objects 4, 5. A color capture unit of the object detection module is provided for capturing and comparing the colors of the character objects 4, 5 in the images as shown in FIGS. 4 and 5 respectively to determine if the character objects 4, 5 in the image as shown in FIG. 5 correspond to the character objects 4, 5 in the image as shown in FIG. 4. Finally, a superimposition detection unit of the object detection module is provided for determining whether or not there is an overlapped portion between the character objects 4, 5 situated at the positions in the image as shown in FIG. 5 and at the positions in the image as shown in FIG. 4.

With the determination of the object made by the aforementioned object detection module, the character objects 5 in the images of FIGS. 4 and 5 situated at different positions can be identified to determine that the character object 5 is a moving object. Therefore, the processing module of the image processing device can remove the character object 5 in the image of FIG. 4 (which is the reference image). In the removed region of the character object 5 in the image of FIG. 4, the frame of the background image in the same region of FIG. 5 is duplicated into FIG. 4 for compensation, so that a complete image of FIG. 4 can be achieved. With the image removal, the user can remove the moving object from the same scene and just keep the desired image.

Figure 7:
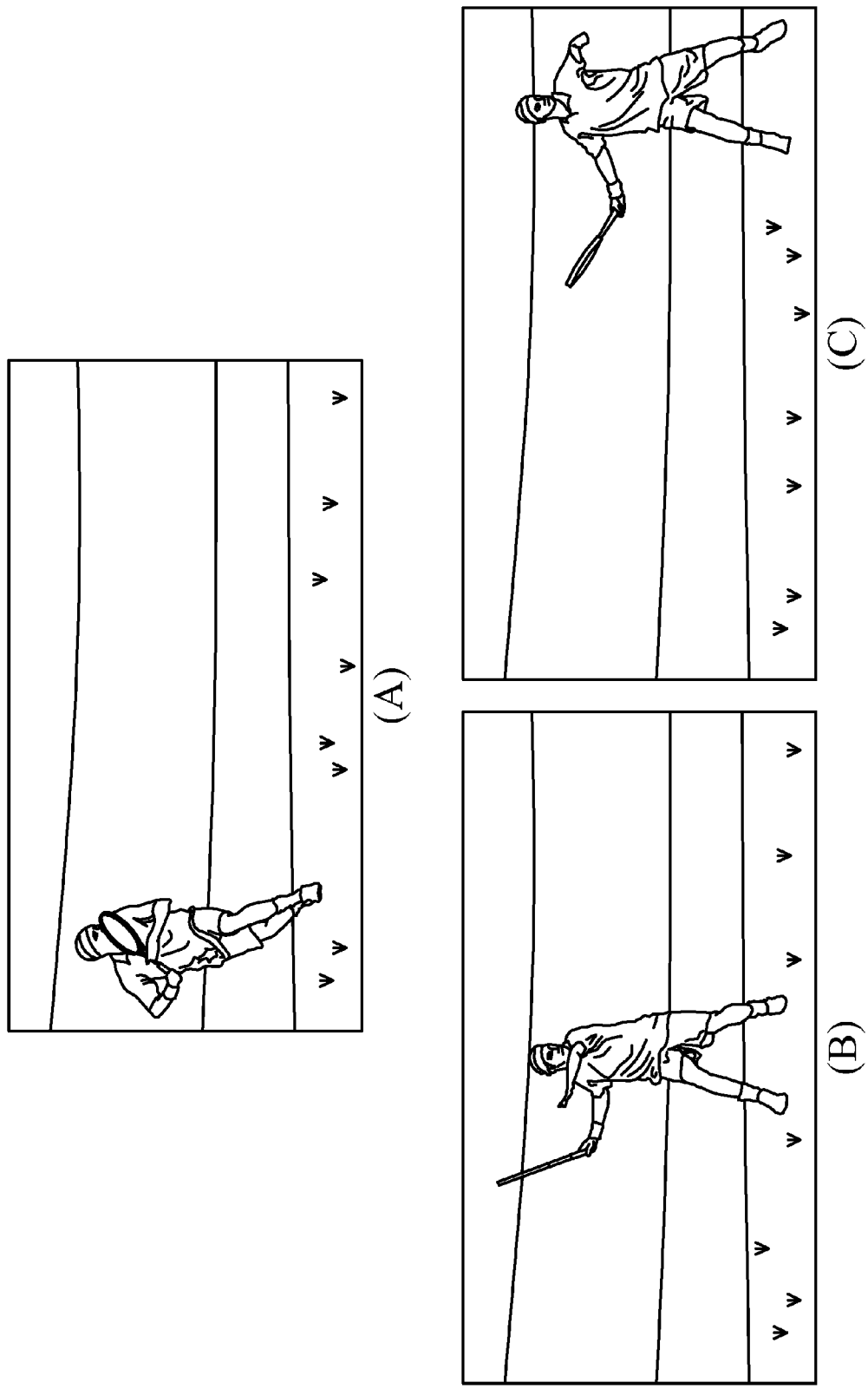
FIG. 7 is a first schematic view of an image processing device and method thereof in accordance with a fourth preferred embodiment of the present invention.

With reference to FIG. 7 for a first schematic view of an image processing device and method thereof in accordance with the fourth preferred embodiment of the present invention, a moving object superimposed in the same image simultaneously is used as an example. In FIG. 7, there are three images (A), (B) and (C), and each of the three images has a character object. The image processing device of the present invention is provided for superimposing the three images having the character object into an image. Firstly, the object detection module of the image processing device selects one of the three images as a reference image, wherein the image (A) is selected as the reference image in this preferred embodiment. And then, the object detection module performs a global motion comparison of the images (B) and (C) with the image (A), so that frames of the three images can be evenly aligned with each other, and then the contours of the character objects in the three images are compared to locate the positions of the character objects situated in the three images respectively. In the process of locating the objects with the corresponding contour, the object detection module will compare the basic background images of the three images to conform that the background frames of the three images are the same, and will compare the character objects with the background frame to determine the position and the size of the character object more accurately. After that, the object detection module will capture and compare the colors of the character objects in the three images to determine if the character objects in the three images are the same person. Finally, the object detection module will detect the positions of the character objects situated in the three images to determine whether or not the position of the character objects in the images (A), (B) and (C) have an overlapped portion.

Figure 8:
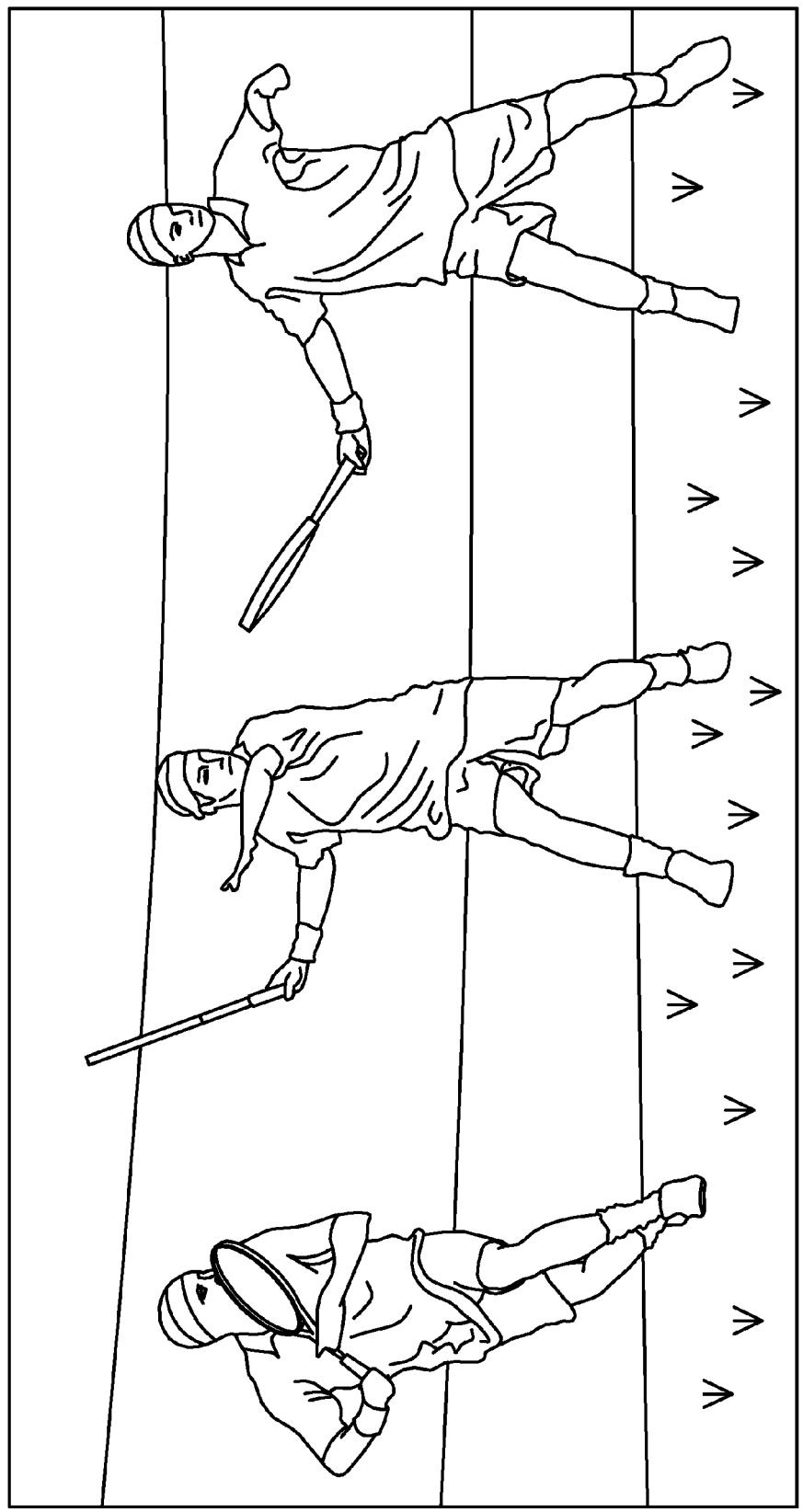
FIG. 8 is a second schematic view of an image processing device and method thereof in accordance with the fourth preferred embodiment of the present invention.

With reference to FIG. 8 for a second schematic view of an image processing device and method thereof in accordance with the fourth preferred embodiment of the present invention, the detection made by the object detection module determines whether or not the character objects in the three images are situated in different regions without any overlapped portions. Since the character objects are moving objects, therefore the processing module can duplicate the character objects of the image (B) and (C) into the image (A) to complete the superimposition of the moving objects onto the same image.

Figure 9:
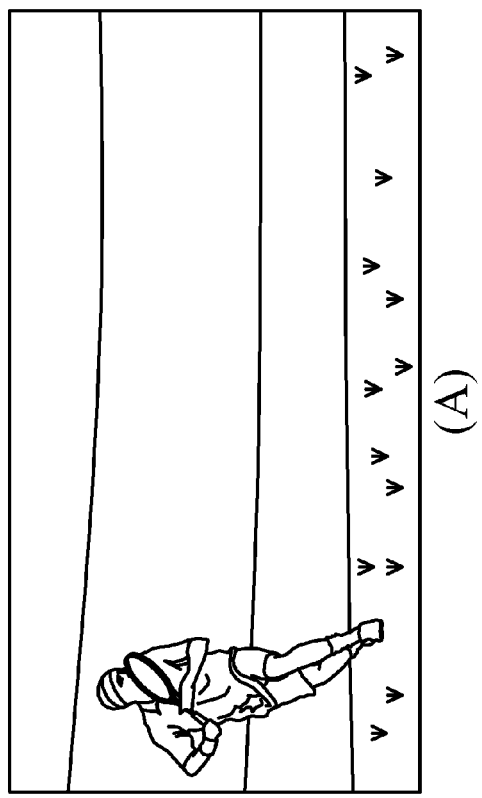
FIG. 9 is a first schematic view of an image processing device and method thereof in accordance with a fifth preferred embodiment of the present invention.
Figure 9:
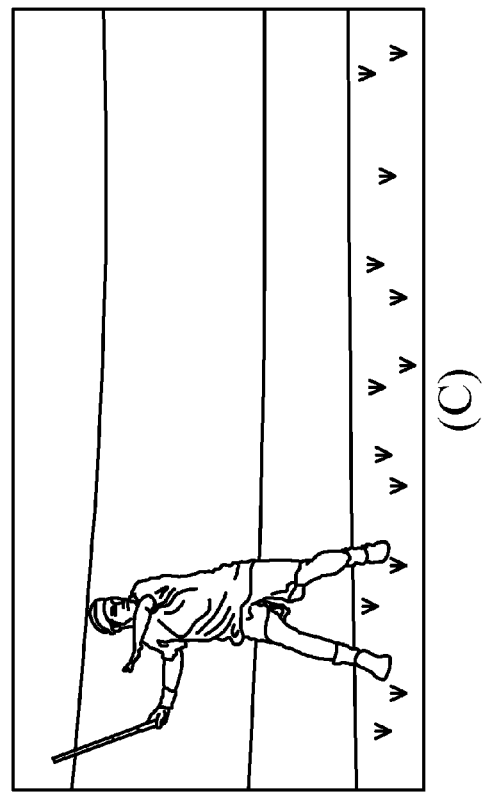
Figure 9:
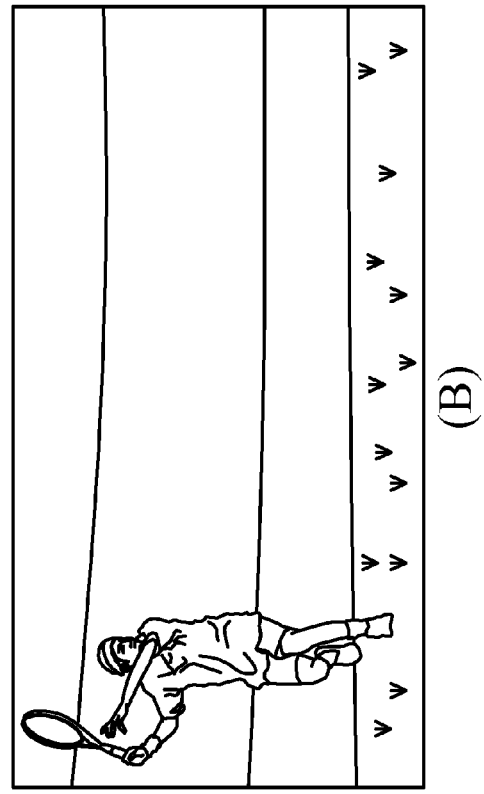

With reference to FIG. 9 for a first schematic view of an image processing device and method thereof in accordance with the fifth preferred embodiment of the present invention, a moving object superimposed on the same image is used for another example. In FIG. 9, there are three images (A), (B) and (C), and each of the three images has a character object. The image processing device of the present invention superimposes the three images having the character objects respectively onto an image. Firstly, the object detection module of the image processing device of the present invention is used to select one of the three images as a reference image, wherein the image (A) is selected as the reference image in this preferred embodiment. The image stabilizing unit of the object detection module is provided for aligning the image (B) and (C) with the image (A) evenly with each other, and then the contour comparing unit of the object detection module performs a contour comparison of comparing the character objects in the three images and locates the positions of the character objects situated in the frame of the three images respectively. During the comparison of the contours of the object characters, the basic image comparing unit of the object detection module will compare the basic background images of the three images at the same time to confirm whether the background frames of the three images are the same and compare the character objects with the background frame to find the position and the size of the character object more effectively. After that, the color capture unit of the object detection module will capture and compare the colors of the character objects in the three images to determine if the character objects in the three images are the same. Finally, the superimposition detection unit of the object detection module detects the positions of the character objects situated in the three images respectively to determine whether the character objects in the three images have an overlapped portion.

Figure 10:
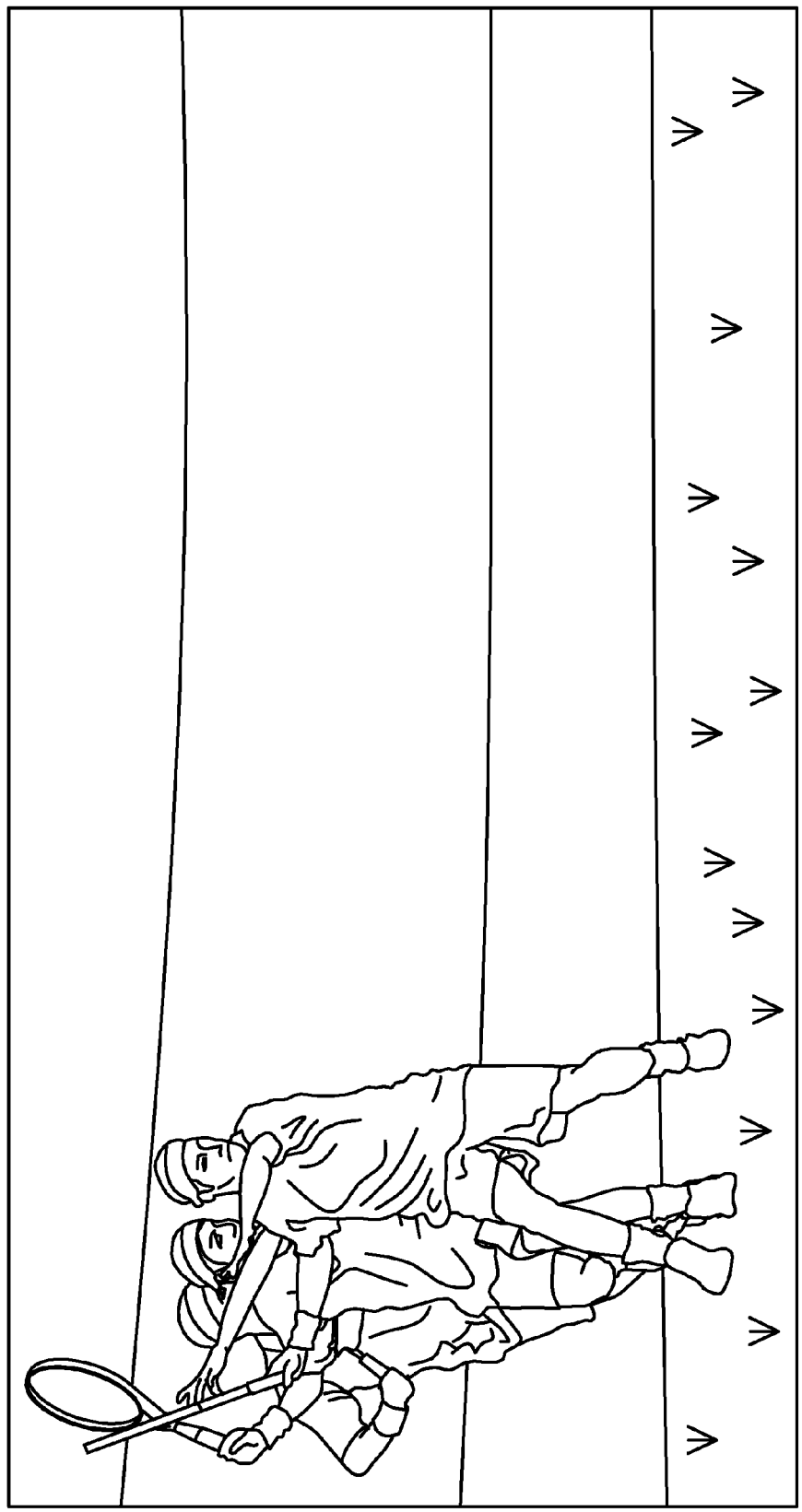
FIG. 10 is a second schematic view of an image processing device and method thereof in accordance with the fifth preferred embodiment of the present invention.

With reference to FIG. 10 for a second schematic view of an image processing device and method thereof in accordance with the fifth preferred embodiment of the present invention, the detection of the character objects conducted by the object detection module determines whether the character objects in the three images are the same person situated at different positions, so that the character objects are moving objects, and there is an overlapped portion in the three images of the character objects. Therefore, the processing unit of the image processing device can perform a boundary detection of the character objects in the three images and start performing the superimposition. In the superimposition method, the superimposition is performed according to the time sequence of capturing the images, wherein the image (A) is captured first, and then the image (B) is captured next, and finally the image (C) is captured. If the last captured image (C) is set to be superimposed first, then the character object in the image (C) will be superimposed to the image (A), and then the character object in the image (B) will be superimposed to the image (A) and connected to the boundary of the previous superimposed character object, and finally the character object of the image (A) is connected to the boundary of the previous superimposed character object. The overlapped portion between the character object and the previous superimposed character object is deleted as shown in FIG. 10.

Figure 11:
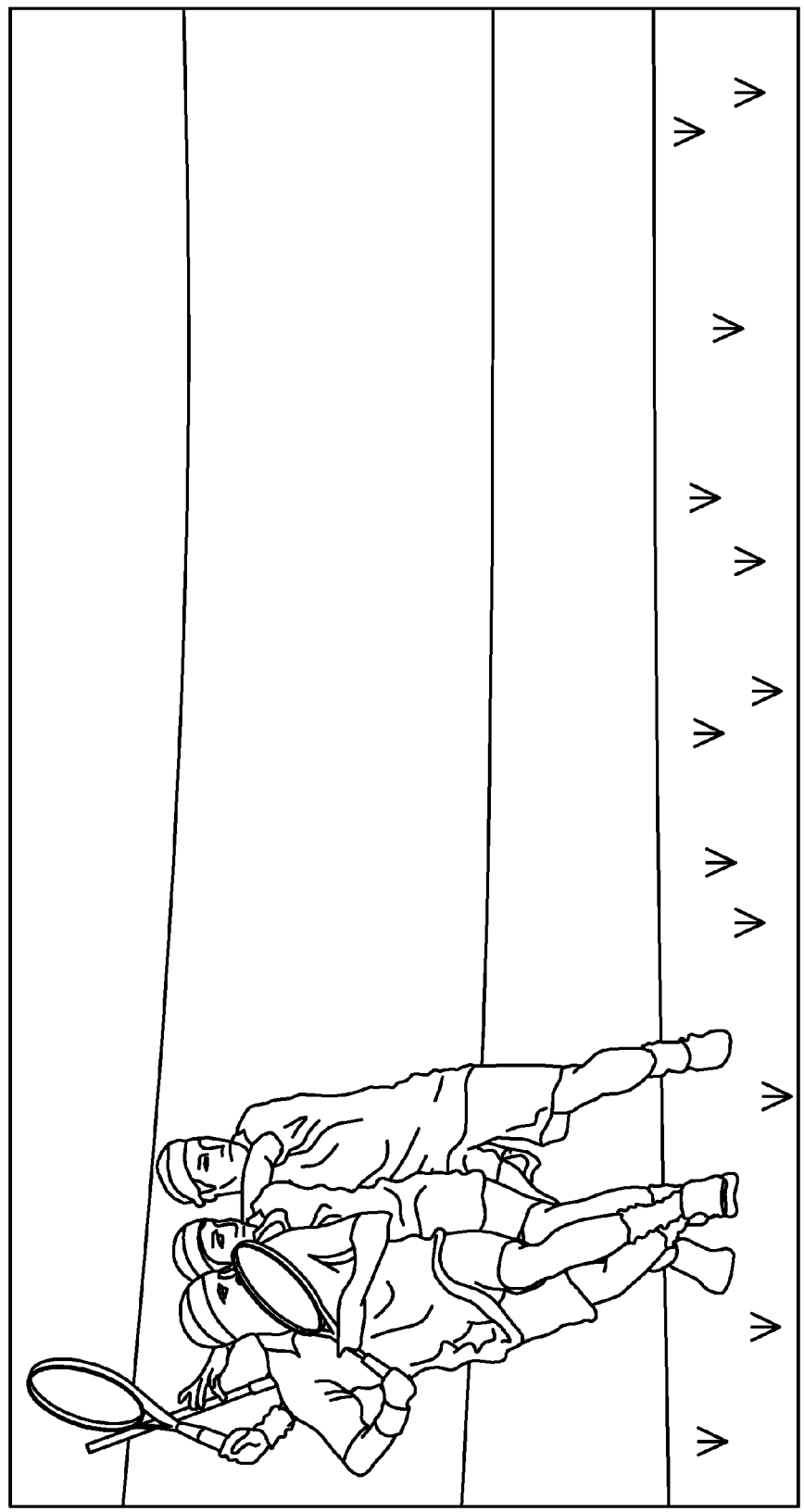
FIG. 11 is a third schematic view of an image processing device and method thereof in accordance with the fifth preferred embodiment of the present invention.

With reference to FIG. 11 for a third schematic view of an image processing device and method thereof in accordance with the fifth preferred embodiment of the present invention, if the captured image (A) is set to be superimposed first, the superimposition sequence is opposite to that of the aforementioned superimposition method. With the superimposition of the moving object, the objects in different images become an object in a continuous motion shown in the same image to make the image more splendid. It is noteworthy to point out that the implementation of the present invention is based on the time sequence of superimposing the image objects, but persons ordinarily skilled in the art should understand that this embodiment is provided for illustrating the present invention only, but not intended for limiting the scope of the invention.

In summation of the description above, the image processing device of the present invention can remove a moving object in the image frame or superimpose the moving object in the same image during a shooting process or a post-processing process of the image, so that users can obtain a more splendid image or photo.

Exemplary embodiments have been disclosed herein, and although specific terms are employed, they are used and are to be interpreted in a generic and descriptive sense only and not for purpose of limitation. Accordingly, it will be understood by those of ordinary skill in the art that various changes in form and details may be made without departing from the spirit and scope of the present invention as set forth in the following claims.

What is claimed is:

1. An image processing device, comprising:
a memory module, for storing a plurality of images captured by a camera module;
an object detection module, electrically coupled to the memory module, and selecting one of the images as a reference image and the other images as remaining images, and performing a contour comparison and a color comparison to compare the remaining images with the reference image, so as to search an object which exists in both the reference image and at least one of the remaining images according to a corresponding contour and a corresponding color, and compare locations of the object in the images; and
a processing module, which comprises an image superimposition unit, electrically coupled to the object detection module and removing the objects in the reference image or superimposing the object of at least one of the remaining images to the reference image if the object detection module determines that the locations of the object in the reference image and at least one of the remaining images are different,
wherein the object detection module comprises a superimposition detection unit for detecting whether or not the corresponding object situated in the region of the reference image and the remaining images has an overlapped portion;
wherein the image superimposition unit will perform an image superimposition directly to superimpose the corresponding object onto the reference image without performing a boundary detection only if the corresponding object is situated at different positions without the overlapped portion; the image superimposition unit will perform the boundary detection of the corresponding object and an image superimposition only if the corresponding object has the overlapped portion.

2. The image processing device of claim 1, wherein the object detection module comprises an image stabilizing unit for performing a global motion comparison of the remaining images with the reference image, so that frames of the remaining images and the reference image are evenly aligned with one another.

3. The image processing device of claim 1, wherein the object detection module comprises a basic image comparing unit for comparing the reference image with a basic background image in the remaining images.

4. The image processing device of claim 1, wherein the object detection module comprises a contour comparing unit for determining whether or not the remaining images have an object with the contour corresponding to the object in the reference image; if yes, then locate a region between the reference image and the remaining images where the corresponding object is situated.

5. The image processing device of claim 1, wherein the object detection module comprises a color capture unit for retrieving a color of the object with the contour corresponding to the object in the reference image and the remaining images and performing a comparison.

6. The image processing device of claim 1, wherein the image superimposition unit further superimposes each corresponding object in the reference image simultaneously according to a time sequence of capturing each image by the camera module.

7. The image processing device of claim 6, wherein a later superimposed object is bound to a boundary of a previous superimposed object and an overlapped portion of the later superimposed object and the previous superimposed object is removed.

8. The image processing device of claim 1, wherein the processing module further comprises an image removal unit for removing the corresponding object in the reference image and duplicating the removed region of the corresponding object from the image of the same region in the remaining images to compensate a junction.

9. An image processing method, comprising the steps of:
using a memory module to store a plurality of images captured by a camera module;
using an object detection module to retrieve one of the images as a reference image and the other images as remaining images, and performing a contour comparison and a color comparison to compare the remaining images with the reference image, so as to search an object which exists in both the reference image and at least one of the remaining images according to a corresponding contour and a corresponding color, and compare locations of the object in the images; and
using a processing module, which comprises an image superimposition unit, to remove the objects in the reference image or superimposing the object of at least one of the remaining images to the reference image if the object detection module determines that the locations of the object in the reference image and at least one of the remaining images are different,
using the object detection module to detect whether or not an overlapped portion of the corresponding object is situated in the regions of the reference image and the remaining images;

the image superimposition unit will perform an image superimposition directly to superimpose the corresponding object onto the reference image without performing a boundary detection only if the corresponding object is situated at different positions without the overlapped portion; the image superimposition unit will perform the boundary detection of the corresponding object and an image superimposition only if the corresponding object has the overlapped portion.

10. The image processing method of claim 9, further comprising the step of using the object detection module to perform a global motion comparison of the remaining images and the reference image, so that frames of the remaining images and the reference image are evenly aligned with each other.

11. The image processing method of claim 9, further comprising the step of using the object detection module to compare with a basic background image in the reference image and in the remaining images.

12. The image processing method of claim 9, further comprising the steps of: using the image superimposition unit to superimpose each corresponding object in the reference image simultaneously according to the time sequence of each image captured by the camera module.

13. The image processing method of claim 9, further comprising the step of using an image removal unit of the processing module to duplicate the removed region of the corresponding object in the reference image from the image in the same region of the remaining images to compensate a junction.

* * * * *